DENTAL PROSTHESIS EXTRACTOR DEVICE
Filed March 20, 1963
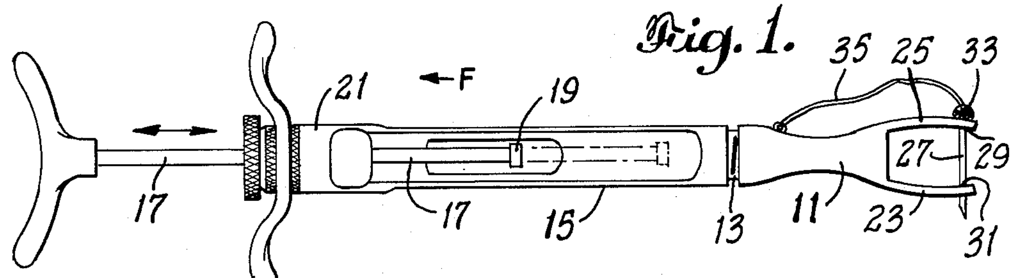
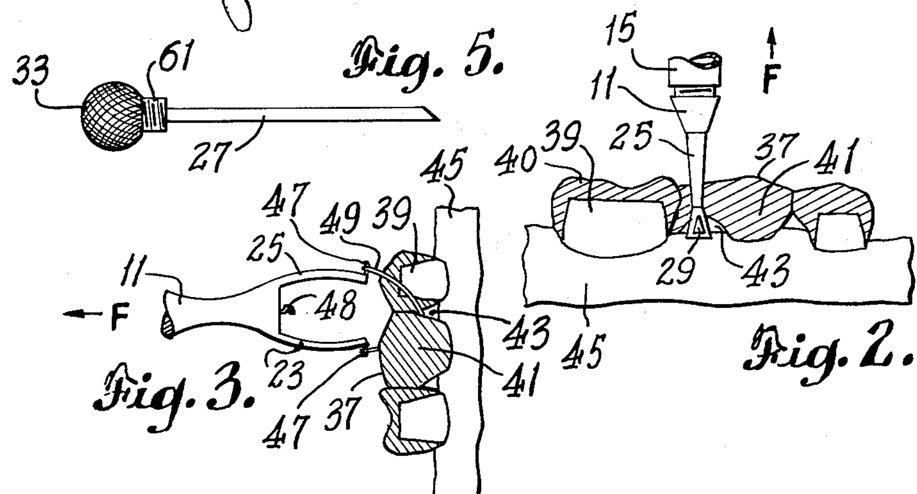
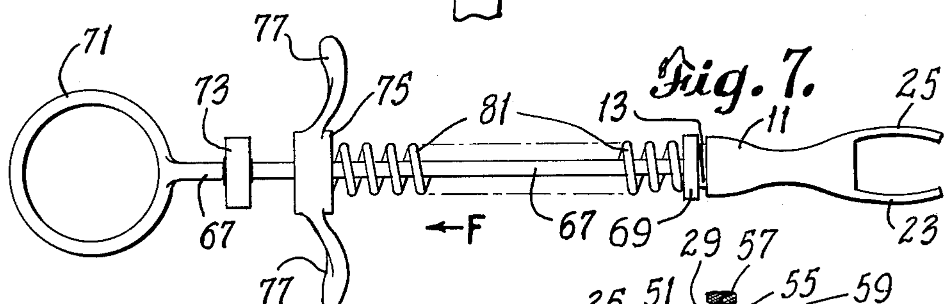
29 57 55 59 25 51 53 F 59 11 Fig. 4. 23 31 55 57
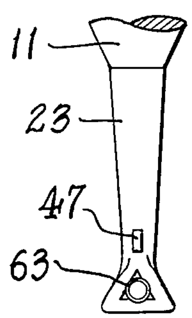
Fig. 6.
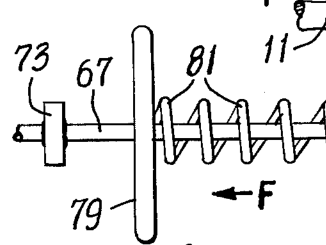
Fig. 8.
INVENTOR.
THOMAS A. ARMAO
BY
J. Hart Evans
ATTORNEY United States Patent Office 3,254,412
Patented June 7, 1966

3,254,412

DENTAL PROSTHESIS EXTRACTOR DEVICE

Thomas A. Armao, 1 78th St., Brooklyn, N.Y.

Filed Mar. 20, 1963, Ser. No. 266,659
16 Claims. (Cl. 32—43)

This invention relates to a device for removing dental prostheses, particularly dental crowns, jackets and caps and fixed bridges retained by crowns, jackets, caps and inlays.

Various methods and techniques have been devised for restoring and repairing human and animal dentition. Frequently the dental defect is caused by caries and a sufficient amount of tooth structure remains to permit restoring the tooth with a suitable filling material such as silver amalgam, synthetic porcelain and cast metal inlays. If however a substantial portion of the crown or coronal portion of the tooth is destroyed then a crown, jacket or cap must be fabricated, fitted and cemented to the patient's remaining tooth stub. Crowns, jackets and caps usually cover the entire visible portion of the tooth and differ from one another in the material from which they are made, i.e., metal, porcelain, etc. As used hereinafter the term "crown" includes crowns, jackets, caps and similar tooth coverings.

In cases where a tooth is lost or missing a prosthetic device, i.e., a false tooth or pontic is fastened or secured to the remaining dentition. In an appropriate situation, usually where the tooth or teeth adjoining the space left by the missing tooth or teeth are sound, the prosthetic device which supports and retains the false tooth may be fastened to the adjacent tooth or teeth by means of clasp wire. Such an assembly constitutes a removable partial denture. If however the remaining dentition adjacent to the hole left by the missing tooth or teeth is a tooth stub covered with a crown, jacket, cap, inlay or similar prosthesis, then the false tooth or teeth can be fused, soldered or similarly attached to the crown, etc., which will serve to retain the false tooth or teeth. The resulting prosthesis assembly is a fixed bridge, in that the retaining crown, jacket, cap, inlay or the like which supports the pontic or false tooth is cemented or bonded to the prepared stub or abutment. Where the retainers are crowns the fixed bridge is called a crown bridge and for convenience the term "crown bridge" as used hereinafter will include all such fixed bridges where the retainers to which the bridging pontic or pontics are attached is a crown, jacket, cap, inlay or the like.

Until recently it was common practice to cement such bridges to the patient's abutment tooth or teeth using zinc oxyphosphate cement. This is a permanent cement which goes into a final set and serves as a permanent binding medium between the crown or crowns and the abutment tooth or teeth. Such permanent cementation was desirable in the past because most of the fixed or permanent bridgework being used was of the soft gold or shell type or of the swedged type. These soft gold crowns were usually prefabricated with the dentist selecting the closest fit and then further fitting the crown with pliers and shears. Later the crowns were swedged on dies and some were made in stainless steel. Permanent cement was thus important not only to bond the crown to the tooth but also to fill in any voids in the fit. Eventually however these permanent cements tend to wash away, which can lead to decay and infection in the resulting crevices and voids. This condition necessitates removal of the crown. The bond of the permanent cement is so strong however the removal is virtually impossible without destruction of the crown and the strong likelihood of damage to or loss of the abutment tooth.

In modern practice nearly all dental crowns are of the cast type. These are made from accurate impressions of the prepared tooth stubs and thus they afford an accuracy and tightness of fit never achievable with the shell type crowns formerly used. Such crowns can be cemented in place with so-called "temporary" cements, such as "Temp-Bond," distributed by the Kerr Company of Detroit, Michigan. While this type of cement gives a bond of the crown to the tooth stub which will last for many years if left undisturbed, the crown can if desired be removed by the dentist without necessarily damaging the crown, tooth stub or abutment tooth. Such removal may be desirable for a number of reasons, including periodic removal of the crown to check for otherwise hidden decay in the tooth stub or abutment tooth. Recession of the gums around the abutment tooth may require removal of the crown to lengthen it. Accidental damage to the porcelain face of a crown which has been made by putting a porcelain coating over metal may require removal of the crown or crown bridge for repair.

Even when the crown is held in place only by temporary cement however, it is frequently difficult to remove it without damaging the crown or abutment tooth. The removal is particularly difficult with porcelain-faced crowns which have porcelain bonded to a metal base. The porcelain tends to crack and chip when force is applied to remove the crown. Such a removal therefore is quite time consuming and requires great skill. To facilitate removal, crowns faced with acrylic plastic have a small projection or "button" on the lingual side of the crown which is the inner side closest to the tongue. This button can be grasped by a hook to facilitate removal of the crown. As the button is usually only on the hidden side of the crown however, force must be applied to it on an angle rather than straight up and down and both the crown and the abutment tooth are thereby subjected to uneven stresses which can readily cause damage. The button can also be quite annoying to the patient's tongue. Moreover, the porcelain-faced crowns and crown bridges rarely have such buttons, and probes and pliers alone must be used for their removal. When crowns are being fitted they are often tried first without cement to check the fit and if the fit is tight they can be difficult to remove even though no cement has been used.

It is an object of the present invention to provide a device to facilitate the removal of crowns and crown bridges which are uncemented or held in place by temporary cement.

A further object of the invention is to provide a device which permits removal of a crown or crown bridge, which is uncemented or held by temporary cement, with minimum danger of damage to the crown or abutment tooth.

Yet another object of the invention is to provide a device to minimize the time required to remove a crown or crown bridge which is uncemented or held by temporary cement and to permit such removal without an extraordinarily high level of practice and skill.

Broadly, the invention comprises an extractor body and attached to the body connecting means which can be passed through the embrasure or space between a crown bridge and the gum adjacent to it. Preferably the extractor body has two substantially parallel arms to which the connecting means are attached. Thus the invention may comprise a harp or Y shaped extractor device, the arms of which are placed around a crown or crown bridge to be removed, with a pin or strap inserted through the embrasure or space between the underside of the crown bridge and the adjacent gum between the crowns and pontics in the bridge, the pin or strap being attached at both ends to the arms of harp or Y. Pressure, preferably of the intermittent type, is applied to the extractor body in the direction away from the crown bridge, thereby dislodging the crown bridge. The invention can be described in more detail with reference to the drawing.

FIGURE 1 is a view of the extractor device attached to a conventional hypodermic syringe, the embodiment of the extractor device being that wherein a pin is inserted under the crown bridge and through holes in the arms of the device.

FIGURE 2 is a view of the extractor device in position over a crown bridge in the embodiment wherein a pin is inserted under the crown bridge and through holes in the arms of the device, a triangular pin hole being shown.

FIGURE 3 is a view of the extractor device in position over a crown bridge, in the embodiment wherein a flexible cord or strap is inserted under the crown bridge and attached at both ends to the arms of the device by means of hooks.

FIGURE 4 is a view of the extractor device in position over a crown in the embodiment wherein adjustable threaded bars are attached to contoured cups inside the Y, which cups, when the threaded bars are screwed tight, grip the crown.

FIGURE 5 is a view of a particular embodiment of a pin used in the device as shown in FIGURE 1.

FIGURE 6 is a side view of the extractor device showing provision for three embodiments in one device, including a triangular hole for the pin of the embodiment shown in FIGURE 2, hooks for the cord or strap of the embodiment shown in FIGURE 3 and circular threaded holes, superimposed on the triangular holes, for the threaded bars of the embodiment shown in FIGURE 4 or for a round pin according to the embodiment shown in FIGURE 1.

FIGURE 7 is a view of the extractor device attached to a shaft with a sliding finger bar and a spring to provide a rapping action on the extractor device.

FIGURE 8 is a partial view of the shaft shown in FIGURE 7 with a different embodiment of the finger bar.

In FIGURE 1 the body 11 of the extractor device is attached through an integral threaded portion 13 to a hypodermic syringe body 15. A piston 17 moves freely in the syringe body 15 and when it is moved quickly in the direction F it moves until the piston head 19 strikes the end 21 of the syringe body 15, and transmits a force in the direction F through the extractor body 11. Either attached to or integral with the extractor body 11 are two arms 23 and 25 spaced far enough apart to fit over and around a tooth crown. A pin 27 is slipped through holes 29 and 31 in the arms 23 and 25. A head 33 on the pin 27 prevents it from slipping completely through the hole 29. A cord or lanyard 35 can be attached between the pin head 33 and the extractor body 11 to prevent accidental loss of the pin 27 in the patient's mouth.

In FIGURE 2 the extractor device is shown in position over a crown bridge 37 between the wall of a crown 40 on an abutment tooth 39 and a false tooth or pontic 41, said pontic 41 being part of the crown bridge 37. The hole 29 is lined up with the space 43 between the crown bridge 37 and the gum 45 so that a pin 27 can be slipped through the hole 29, and space 43 and then through the opposite hole 31. When force is applied in the direction F to the extractor body 11 it is transmitted through the arms 23 and 25 to the pin 27 and through it to the crown bridge 37, thereby dislodging the crown bridge 37.

In FIGURE 3 the extractor device is shown in position above a crown bridge 37. Hooks 47 are attached to the arms 23 and 25. A flexible cord or strap 49 is attached to the hooks 47 after being run through the space 43 between the crown bridge 37 and the gum 45. The space 43 is formed by the wall of the crown 40 on the abutment tooth 39 and the pontic 41, said pontic 41 being part of the crown bridge 37. Also shown in FIGURE 3 is a single hook 48 on the extractor body 11 to which both ends of the cord or strap 49 can be attached. With such a single hook 48 the arms 23 and 25 are not necessary. When force is applied in the direction F to the extractor body 11 it is transmitted through the arms 23 and 25 to the hooks 47 or directly to the single hook 48 and thence through the cord or strap 49 to the crown bridge 36, thereby dislodging the crown bridge 37.

In FIGURE 4 the extractor device is shown in position over and around a single crown 51 covering a tooth stub or abutment tooth 53. The holes 29 and 31 are threaded and threaded bars 55 are screwed into them. The threaded bars 55 are adjusted from outside the arms 23 and 25 by knobs 57 which can be turned with the fingers. The other ends of the threaded bars 55 are attached to buttons 59. The buttons 59 are slightly concave on their inner surfaces and may be lined with a soft or resilient material such as rubber so as to better conform to and grip the crown 51 without damaging it when the threaded bars 55 are tightened. When force is applied to the extractor body 11 in the direction F it is transmitted through the arms 23 and 25, the threaded bars 55 and the buttons 59 to the crown 51, thereby pulling the crown 51 from the tooth stub 53.

In FIGURE 5 can be seen a special configuration of the pin 27 equipped with an over-sized and knurled head 33 and a threaded collar 61 with quick locating threads. When this type of pin is used the hole 29 is threaded to accommodate the collar 61 and the hole 31 is made large enough to receive the end of the pin 27 and permit it to turn freely as the collar 61 is threaded in. Such a pin 27 can be secured tightly in the arm 23 of the extractor device by a turn of the knurled pin head 33, thus preventing the pin 27 from slipping out of the extractor device when the pin is in place under a crown bridge.

In FIGURE 6 can be seen arm 23 adapted for use with either a pin 27, a cord or strap 49, a threaded bar 55 or a pin 27 with a threaded collar 61. The hole 63, which corresponds to the hole 29 in FIGURES 1, 2 and 4, has internal circular threads superimposed on a triangular shape. Thus the hole 63 can accommodate a triangular shaped pin 27 as well as threaded bar 55 or a pin 27 with a threaded collar 61. The hooks 47 can accommodate a cord or strap 49. Thus one extractor body 11 can accommodate a number of embodiments of the invention.

Although the extractor device body 11 can be screwed to an ordinary hypodermic syringe of the type illustrated in FIGURE 1, a better rapping action to dislodge the crown or crown bridge can be achieved when the extractor body 11 is attached to a special rapping device of the type illustrated in FIGURE 7. This device comprises a shaft 67 having a threaded portion 13 at one end and adjacent to the threaded portion a collar 69. At the other end of the shaft 67 is a thumb loop 71 and adjacent to it a stop collar 73 affixed to the shaft 67. On the shaft between the stop collar 73 and the collar 69 is a sliding finger bar collar 75. Attached to or integral with the finger bar collar 75 are preferably at least one finger stop 72 projecting from the collar 75. There may be a pair of the finger stops 77 in opposed position around the collar 75 or the finger stop may consist of a greatly enlarged finger bar collar 79, as shown in FIGURE 7. In FIGURE 7, between the finger bar collar 75 and the collar 69 is a compressible spring 81. When the spring 81 is compressed by pushing the finger bar collar 75 toward the collar 69 and then released, the finger bar collar 75 is forced suddenly back along the shaft 67 until it strikes the stop collar 73, thereby transmitting a sudden rapping force in the direction F through the extractor device body 11, the arms 23 and 25 and the attached pin 27, cord or strap 49 or threaded bars 55 and buttons 59 to the crown or crown bridge, thereby dislodging it.

To use the extractor device the dentist merely screws the extractor body 11 or otherwise attaches it to either a syringe, the spring loaded shaft shown in FIGURE 7 or any other suitable device to give the desired force. He then places the extractor arms 23 and 25 above or over the crown or crown bridge to be removed and then inserts the pin 27, or attaches the cord 49 or screws in the threaded bars 55 as he deems appropriate for the particular crown or crown bridge being removed. He then applies force to the extractor body 11 by whatever device is attached to it and this force, transmitted through the arms 23 and 25 and the pin 27 for the cord or strap 49 or the threaded bars 55 and the buttons 59, acts on the crown or crown bridge to remove it from the abutment teeth. Because the removing force is perpendicular to the biting surface of the tooth the damage due to uneven stresses on the crown or crown bridge is substantially eliminated and the attendant danger of chipping or cracking the crown or abutment tooth is likewise minimized.

The extractor device body 11 may be attached to any type of hypodermic syringe having a plunger handle which can be worked to give a rapping action. While FIGURE 1 of the drawing illustrated such a suitable syringe, the extractor device of the invention is not limited to use with a syringe designed according to this particular embodiment.

The extractor body 11 may be formed of any suitable material such as metal or plastic as may be the arms 23 and 25 which may be integral with body 11 or attached to it. The arms 23 and 25 should be substantially parallel to one another.

The cross-sectional shape of the pin 27 is not critical. It may be round, oval, oblong, triangular, or any other desired shape. It should however be of a size such as to fit in the space 43 shown in FIGURE 2 between the crown bridge 37 and the gum 45 formed by the wall of the crown 40 on the abutment tooth 39 and the pontic 41 or by two pontics. This space 43 tends to be generally triangular in shape, with the base of the triangle along the gum 45 and with the apex of the triangle pointing away from the gum 45. Thus a generally triangular shape for the pin 27 is particularly suitable and preferred, with at least the hole 31 triangularly shaped and sized to receive the pin 27 and keep it from turning. If the locking feature illustrated in FIGURE 5 is employed with a trianguar pin 27 then the collar 61 and pin head 33 should be integral or fixedly attached to one another, but free to rotate on the pin 27 to permit locking after the triangular pin 27 is inserted in a triangular hole 31. This rotating feature is desirable if the pin 27 is any shape other than round. If the pin 27 is round then the collar 61 and pin head 33 may be integral with or fixedly attached to the pin 27. If the locking feature is not employed then of course the pin 27 and head 33 are integral or fixedly attached regardless of the cross-sectional shape of the pin.

Any corners on the pin 27, as in the case of a triangular or square cross-sectional shape of the pin, should be rounded to prevent damage to the gums or prostheses. The pin 27 itself may be of any suitable material such as bone, metal, plastic, or the like. In the case of a metal pin particularly, it may be desirable to coat the pin 27 with a smooth coating such as plastic. The pin 27 may be disposable if desired.

The cord or strap 49 may be made of any suitable flexible material such as silk or plastic. It can be made rounded or flat in cross-section, the shape being noncritical as long as it will slip freely through the space 43 shown in FIGURE 3 between the crown bridge 37 and the gum 45 formed by the wall of the crown 40 on the abutment tooth 39 and the pontic 41, or a similar space between two pontics.

The buttons 59 are generally shaped on their concave inner faces to conform to the crown to be gripped. Thus an assortment of buttons with various sized and shaped inner faces may be desirable to grip different sizes and shapes of crowns. The inner surface of the buttons 59 can if desired by coated with a soft or resilient material such as rubber, plastic, foamed rubber, foamed plastic or the like.

While the extractor body 11 is shown attached to a hypodermic syringe in FIGURE 1 and to a special rapping device in FIGURE 7, neither is essential to the use of the extractor device. All that is necessary is that force be applied to the extractor body 11 in a direction away from the abutment tooth or tooth stub from which the crown or crown bridge is to be removed. This can even be done by simply attaching a rod or handle to the extractor body 11 and then pulling on the handle. Preferably, however, a rapping action is applied whereby the extractor body 11 is in effect tapped away from the crown or crown bridge with a succession of light blows. This can be achieved with such a simple device as a sliding weight on a rod, the rod being attached to the extractor body 11 at one end and having a stop for the weight at the other. Sliding the weight away from the extractor body 11 and against the stop could thus provide the desired rapping action.

The special rapping device illustrated in FIGURE 7 is one especially designed for use with the extractor body 11 and one which gives the desired rapping action readily and effectively. The thumb loop 71 permits operation with one hand, the fingers being used to push down the finger stop 77 against the compression spring 81 and then release it to give the desired rapping action.

It is to be understood that the scope of the invention is limited only by the claims following and is not limited to any particular embodiments described herein, the scope of the invention including any variations and modifications which may occur to those skilled in the art and which fall within the scope of the claims.

What is claimed is:

1. A dental prosthesis extractor device comprising an extractor body, a rapping component having two elements linearly slideably attached to each other positioned at one end of said extractor body, two substantially parallel arms extending from the other end of said body and having holes in the ends of said arms, and a removable pin having an enlarged head and adapted, when said holes in said two arms are positioned on opposite sides of an embrasure space between a dental crown bridge and the gum adjacent to it, to be passed consecutively through the hole in one of said arms, through said embrasure space and then through the hole in the other of said arms until said enlarged head contacts the first of said arms and thereby positions and retains said pin in said holes, said extractor body being attached to one of said slideable elements of said rapping component so that an intermittent force can be imparted to said extractor body and through said arms of said body and said pin to said dental crown bridge.

2. A dental prosthesis extractor device according to claim 1 wherein said removable pin has a substantially round cross section.

3. A dental prosthesis extractor device according to claim 1 wherein said removable pin has a substantially triangular cross section.

4. A dental prosthesis extractor device according to claim 1 wherein said removable pin has a smooth coating on its surface.

5. A dental prosthesis extractor device according to claim 1 wherein said enlarged head of said pin is connected to said extractor body by a lanyard.

6. A dental prosthesis extractor device comprising an extractor body, a rapping component having two elements slideably attached to each other positioned at one end of extractor body, two substantially parallel arms extending from the other end of said body, fastening means at the end of each of said arms, and a flexible cord adapted to be passed through an embrasure space between a dental crown bridge and the gum adjacent to it, one end of said cord being removably attached to said fastening means on one of said arms and the other end of said cord being removably attached to said fastening means on the other of said arms, said extractor body being attached to one of said slideable elements of said rapping component so that an intermittent force can be imparted to said extractor body and through said arms of said body and said cord to said dental crown bridge.

7. A dental prosthesis extractor device according to claim 6 wherein said fastening means are hooks and said cords has a loop at each end.

8. A dental prosthesis extractor device comprising an extractor body, a rapping component having two elements slideably attached to each other positioned at one end of said extractor body, two substantially parallel arms extending from the other end of said body, fastening means at the end of each of said arms, and a flexible strap adapted to be passed through the embrasure space between a dental crown bridge and the gum adjacent to it, one end of said strap being removably attached to said fastening means on one of said arms and the other end of said strap being removably attached to said fastening means on the other of said arms, said extractor body being attached to one of said slideable elements of said rapping component so that an intermittent force can be imparted to said extractor body and through said arms of said body and said strap to said dental crown bridge.

9. A dental prosthesis extractor device according to claim 8 wherein said fastening means are hooks and said straps has a loop at each end.

10. A dental prosthesis extractor device comprising an extractor body, a hypodermic syringe component having a moveable plunger positioned at one end of said extractor body, two substantially parallel arms extending from the other end of said body, and connecting means capable of passing through an embrasure space between a dental crown bridge and the gum adjacent to it removably attached to the ends of said arms, said extractor body being attached to the body of said hypodermic syringe so that movement of said syringe plunger can impart an intermittent force through said hypodermic syringe body to said extractor body and through said arms of said body and said connecting means to said dental crown bridge.

11. A dental prosthesis extractor device according to claim 10 wherein there are holes in the ends of said arms and said connecting means is a removable pin having an enlarged head and adapted, when said holes in said two arms are positioned on opposite sides of an embrasure space between a dental crown bridge and the gum adjacent to it, to be passed consecutively through the hole in one of said arms, through said embrasure space and then through the hole in the other of said arms until said enlarged head contacts the first of said arms and thereby positions and retains said pin in said holes.

12. A dental prosthesis extractor device according to claim 10 wherein there are fastening means at the end of each of said arms and said connecting means is a flexible cord adapted to be passed through an embrasure space between a dental crown bridge and the gum adjacent to it, one end of said cord being removably attached to said fastening means on one of said arms and the other end of said cord being removably attached to said fastening means on the other of said arms.

13. A dental prosthesis extractor device according to claim 10 wherein there are fastening means at the end of each of said arms and said connecting means is a flexible strap adapted to be passed through an embrasure space between a dental crown bridge and the gum adjacent to it, one end of said strap being removably attached to said fastening means on one of said arms and the other end of said strap being removably attached to said fastening means on the other of said arms.

14. A dental prosthesis extractor device comprising an extractor body, a rapping component positioned at one end of said extractor body, two substantially parallel arms extending from the other end of said body and having holes in the ends of said arms, and a removable pin having an enlarged head and adapted, when said holes in said two arms are positioned on opposite sides of an embrasure space between a dental crown bridge and the gum adjacent to it, to be passed consecutively through the hole in one of said arms, through said embrasure space and then through the hole in the other of said arms until said enlarged head contacts the first of said arms and thereby positions and retains said pin in said holes, said extractor body being attached to one end of the shaft of said rapping component so that an intermittent force can be imparted to said extractor body and through said arms of said body and said pin to said dental crown bridge, said rapping component comprising a thumb loop on the other end of said shaft, a stop collar fastened on said shaft adjacent to said thumb loop, a finger bar collar sliding on said shaft between said stop collar and a second collar fastened on the end of said shaft adjacent to said body, and a compressible spring between said finger bar collar and said second collar.

15. A dental prosthesis extractor device comprising an extractor body, a rapping component positioned at one end of said extractor body, two substantially parallel arms extending from the other end of said body, fastening means at the end of each of said arms, and a flexible cord adapted to be passed through the embrasure space between a dental crown bridge and the gum adjacent to it, one end of said cord being removably attached to said fastening means of one of said arms and the other end of said cord being removably attached to said fastening means on the other of said arms, said extractor body being attached to one end of the shaft of said rapping component so that an intermittent force can be imparted to said extractor body and through said arms of said body and said cord to said dental crown bridge, said rapping component comprising a thumb loop on the other end of said shaft, a stop collar fastened on said shaft adjacent to said thumb loop, a finger bar collar sliding on said shaft between said stop collar and a second collar fastened on the end of said shaft adjacent to said body, and a compressible spring between side finger bar collar and said second collar.

16. A dental prosthesis extractor device comprising an extractor body, a rapping component positioned at one end of said extractor body, two substantially parallel arms extending from the other end of said body, fastening means at the end of each of said arms, and a flexible strap adapted to be passed through the embrasure space between a dental crown bridge and the gum adjacent to it, one end of said strap being removably attached to said fastening means on one of said arms and the other end of said strap being removably attached to said fastening means on the other of said arms, said extractor body being attached to one end of the shaft of said rapping component so that an intermittent force can be imparted to said extractor body and through said arms of said body and said strap to said dental crown bridge, said rapping component comprising a thumb loop on the other end of said shaft, a stop collar fastened on said shaft adjacent to said thumb loop, a finger bar collar sliding on said shaft between said stop collar and a second collar fastened on the end of said shaft adjacent to said body, and a compressible spring between said finger bar collar and said second collar.

References Cited by the Examiner

UNITED STATES PATENTS

| | | | |
|---|---|---|---|
| 183,602 | 10/1876 | Strubell | 128—346 |
| 503,298 | 8/1893 | Tuefel | 30—280 |
| 712,989 | 11/1902 | Washburn | 128—320 |
| 789,889 | 5/1905 | Sutherland | 146—129 |
| 938,640 | 11/1909 | Chott | 32—43 |
| 1,177,706 | 4/1916 | Johnson | 32—44 |
| 1,190,180 | 7/1916 | McAllister | 32—64 |
| 1,363,534 | 12/1920 | Rogers | 128—76 |
| 1,416,514 | 5/1922 | Saperstein | 128—320 |
| 1,666,860 | 4/1928 | Maranda | 32—43 X |
| 2,225,274 | 12/1940 | MacGoun | 128—76 X |

(Other references on following page)

UNITED STATES PATENTS

| | | | |
|---|---|---|---|
| 2,227,270 | 12/1940 | Moore | 128—320 |
| 2,337,971 | 12/1943 | Caviglia | 32—40 |
| 2,443,415 | 6/1948 | Buscarino | 132—91 |
| 2,702,555 | 2/1955 | De Mar | 132—91 |
| 2,776,490 | 1/1957 | Carfagni | 32—40 |
| 2,793,886 | 5/1957 | Weiss | 287—100 X |
| 2,873,749 | 2/1959 | Gjerde | 132—91 |
| 2,876,770 | 3/1959 | White | 128—215 |
| 2,881,520 | 4/1959 | Mito | 30—280 |
| 2,923,359 | 2/1960 | Duffield et al. | 287—100 |
| 3,058,218 | 10/1962 | Kleesattel et al. | 32—27 |

FOREIGN PATENTS

| | | |
|---|---|---|
| 49,910 | 3/1889 | Germany. |

OTHER REFERENCES

Journal of Bone and Joint Surgery, vol. 38–A, No. 1. January 1956, "An Instrument For Use In Extracting Rush Pins," by Ben Fox et al., Fig. 1 on page 225.

RICHARD A. GAUDET, *Primary Examiner.*

JAMES W. HINEY, Jr. *Assistant Examiner.*